L. P. BUCK.
SPRING WHEEL.
APPLICATION FILED JAN. 28, 1914.
1,199,154.
Patented Sept. 26, 1916.
2 SHEETS—SHEET 2.
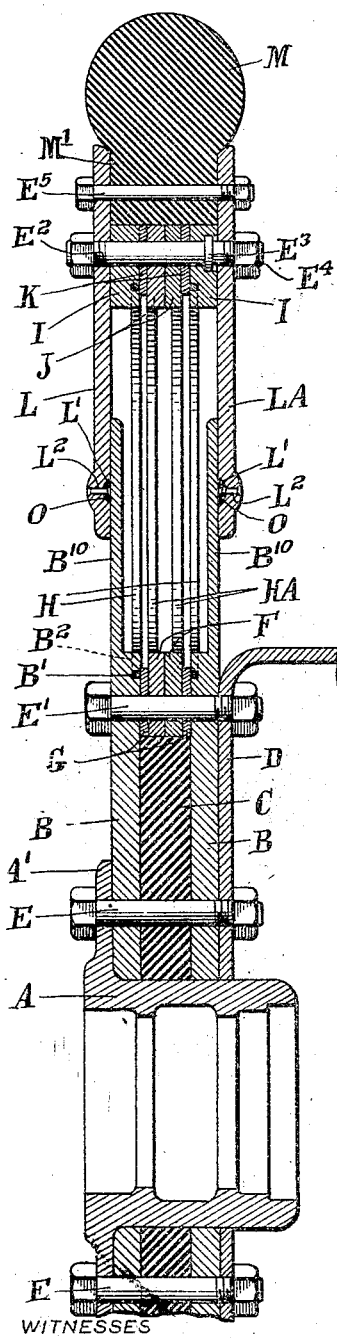
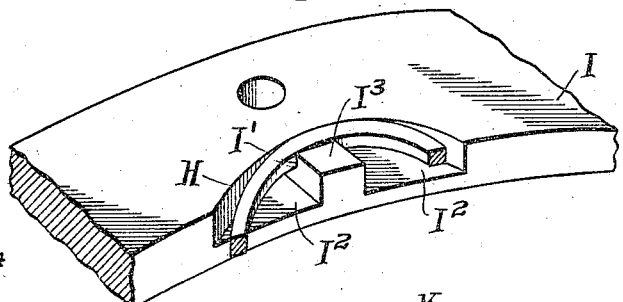
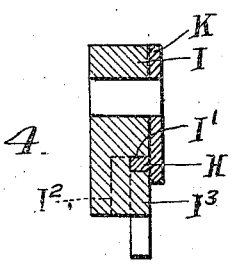
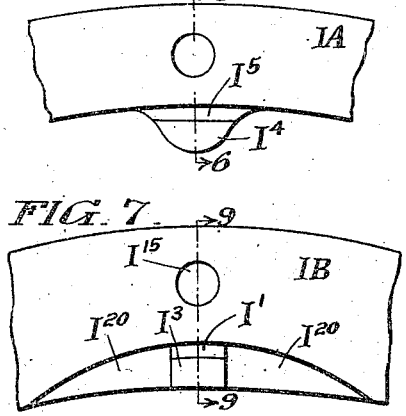
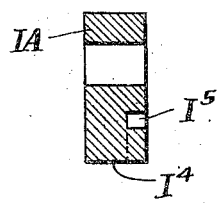
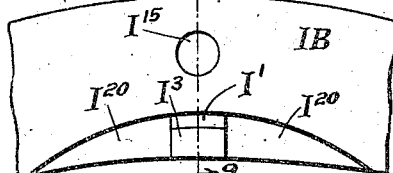
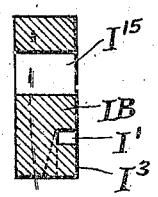
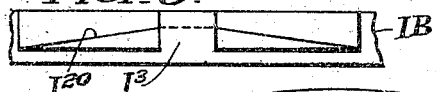
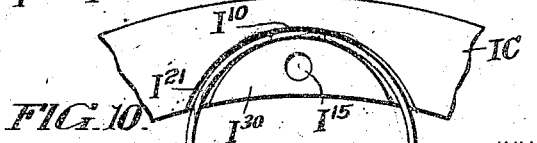
INVENTOR
Lewis P. Buck
BY Francis T. Chamberlin
ATTORNEY
WITNESSES
Daniel Webster Jr.

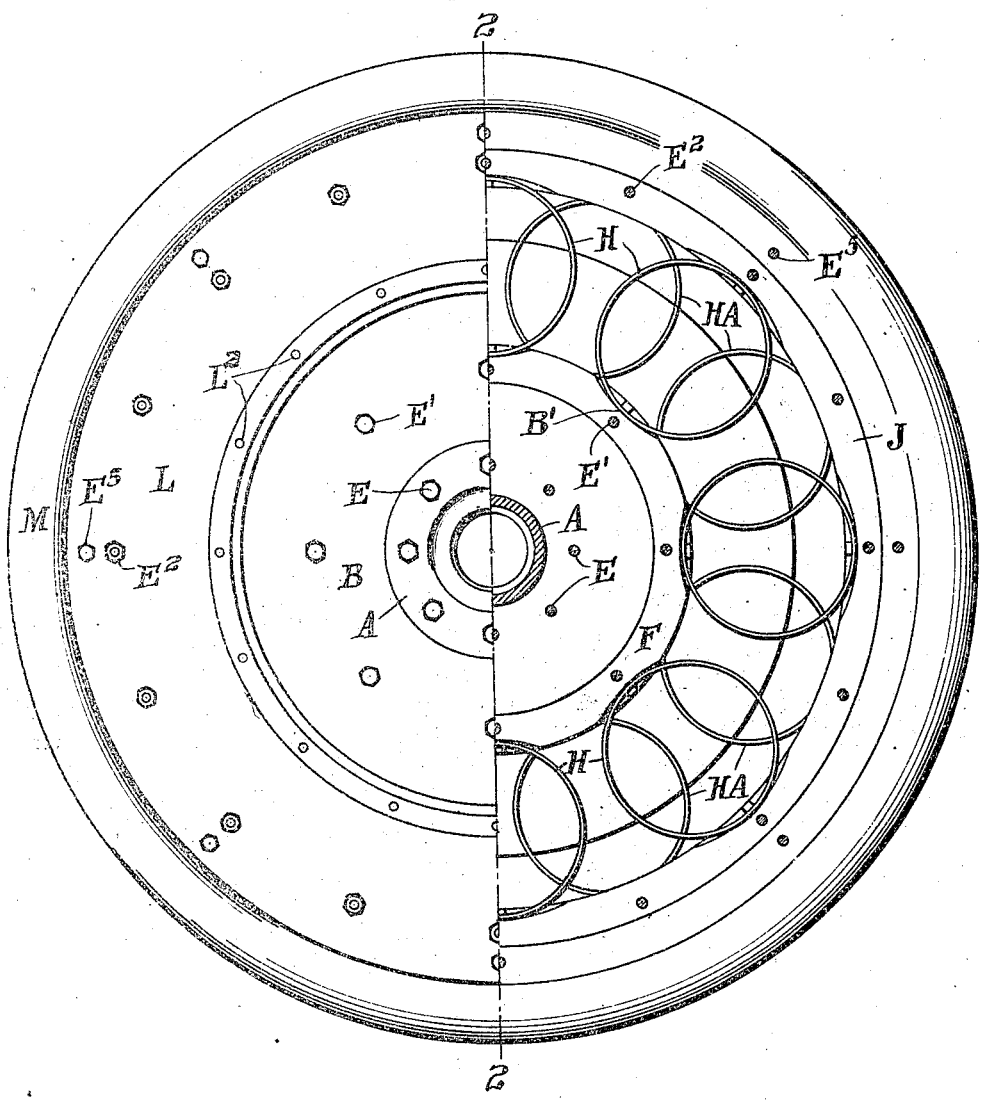

UNITED STATES PATENT OFFICE.

LEWIS P. BUCK, OF WILMINGTON, DELAWARE.

SPRING-WHEEL.

1,199,154.　　　　　Specification of Letters Patent.　　Patented Sept. 26, 1916.

Application filed January 28, 1914.　Serial No. 814,935.

*To all whom it may concern:*

Be it known that I, LEWIS P. BUCK, a citizen of the United States of America, residing in Wilmington, in the county of New Castle, in the State of Delaware, have invented certain new and useful Improvements in Spring-Wheels, of which the following is a true and exact description, reference being had to the accompanying drawings, which form a part thereof.

My present invention consists in an improved spring wheel of the type in which the rigid felly of the wheel is connected to the wheel hub by springs which form the weight and power transmitting connections between the hub and felly.

The primary object of my invention is to provide a durable and effective wheel of the type referred to, which, while possessing ample lateral stiffness and strength as well as a radial strength and resilience, and made practically entirely of metal, is comparatively light in weight, and simple and relatively inexpensive in construction.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described forms in which my invention may be embodied.

Of the drawings: Figure 1 is an elevation of a preferred form of wheel embodying my invention, with various securing bolts in section and certain metal plates broken away and removed in the right half of the view; Fig. 2 is a partial radial section taken on the line 2—2 of Fig. 1; Fig. 3 is a fragmentary perspective view of one of the metallic laminæ or annular plates composing the felly; Fig. 4 is a vertical section through the felly section shown in Fig. 3; Fig. 5 is an elevation of a portion of a modified form of felly forming laminæ; Fig. 6 is a section taken on the line 6—6 of Fig. 5; Fig. 7 is a view taken similarly to Fig. 5, showing a third laminæ construction; Fig. 8 is an inverted plan of the structure shown in Fig. 7; Fig. 9 is a section taken on the line 9—9 of Fig. 7; and Fig. 10 is a view taken similarly to Fig. 5, showing another modification of the felly forming laminæ.

In the wheel construction shown in Figs. 1 and 2, A represents a metallic hub body of common form, and it is one of the advantages of my invention that the invention may be utilized with any of the usual forms of hubs. As shown, the hub A is formed with a flange A', against which are clamped annular plates or apertured disks B, C, B and D. The plate C is advantageously formed of non-metallic material, such as vulcanite or the like, and is clamped between the plates B, B. The plate D is for use as a part of the brake mechanism commonly employed on the rear wheels of automobiles, and may be omitted without affecting the general construction or operation of my improved wheel. Fitting snugly about the disk C are a pair of annular plates F and a pair of annular plates G. The plates F, F are placed side by side and are separated from each of the plates B by a corresponding plate G. The plates F and G are rigidly clamped between the plates B, B by bolts E'. Between each plate G and the adjacent plate B are clamped a series of springs H, and between each plate G and the adjacent plate F are clamped a series of similar springs HA. The arrangement of the springs H and HA, and the manner in which they are secured between the plates G and B and G and F will be hereinafter explained.

The plates B, B have extensions $B^{10}$ preferably of reduced thickness, which pass between, and fit snugly against a pair of spaced apart annular plates L and LA, the outer portions of which form parts of the felly of the wheel. The plate extensions $B^{10}$ and the plates L and LA form the side walls of the housing inclosing the springs H and HA. As shown, the wheel felly also comprises outer annular plates I, I, annular spacer plates K, and a pair of central annular plates J. The various plates I, J and K are clamped to the plate L by the bolts $E^2$ passing through these plates. The plate I adjacent the plate LA is counter-bored to receive the shoulders $E^3$ of the bolts $E^2$. Each bolt $E^2$ has an extension $E^4$ passing through the plate LA. These extensions $E^4$ are threaded so that the plate LA may be clamped to the other parts of the wheel felly by nuts on the bolt extensions. As shown, the plates J correspond in thickness to the wheel center plates F and are arranged in the same planes perpendicular to the axis of the wheel. Similarly, the plates K are of the same thickness and are in the same planes with the plates G, and the plates I are of the same thickness as the spring clamping portions of the plates B. One set of springs H are clamped between one adjacent pair of plates I and K, and the other set of springs H are clamped between the other plates I and K. The springs HA are clamped at their outer edges between the corresponding plates J and K.

As shown best in Figs. 3 and 4, each plate I is shaped to provide short grooved seats I', one for each of the corresponding springs H, and recesses I² at the opposite sides of the lugs I³ which form the inner walls of the grooved seats I'. Each grooved seat I' is shaped to snugly receive the corresponding spring H, which is advantageously made rectangular in cross section as shown, and the portion of the spring received in its seat I' is clamped between the bottom wall of the grooved seat and the adjacent spacer or clamping plate K. Advantageously, as shown, the annular plates K are of greater internal diameter than the plates I, so that the plates K bear against the side edges of but short portions of the springs H at each seat I'. In consequence of this fact and of the recesses I² provided at the opposite side of each seat, only the small portion of each spring H actually received within the grooved seat I' is restrained from yielding as the load imposed upon it may require. As shown, the outer wall of each seat I', and the outer edges of the adjacent recesses I² form part of a cylindrical surface slightly larger in diameter than that of the spring H. Each spring H is gripped at its inner side between the corresponding plate B and the adjacent plate G exactly as it is gripped at its outer side between the plates I and K. The plates B are formed with grooved seats B' and recesses B², corresponding to the seats I' and recesses I² in the member I. As shown each spring in the one set of springs H is coaxial with a corresponding spring in the other side of the springs H, and the springs HA, which are arranged in coaxial pairs, are staggered with respect to the springs H. The size, number and relative arrangement of springs employed may vary quite widely, it being only essential in general that the springs be numerous enough and so disposed that the spring action will be substantially uniform in different angular positions of the wheel, and that in any angular position of the wheel the usual load will be so distributed among the springs taking it that no one spring will be overloaded. The plates F and J are formed with grooved seats and recesses for the springs HA similar to the grooved seats I' and B' and recesses I² and B² of the plates I and B, respectively.

With the wheel construction described the tire M employed need not be a yielding tire, although if desired it may be and, as shown, is a solid rubber tire. The tire M shown has an internal portion M' which fits snugly about the plates I, J and K, and is clamped between the plates L and LA by the bolts E⁵. The outer portions of the plates L and LA are shaped to receive the portion of the tire held between them. To remove the tire from the wheel it is only necessary to unscrew the nuts on the bolts E⁵ and on the extensions E⁴ of the bolts E². This permits the plate LA to be removed from the wheel without otherwise disturbing the wheel structure, and after the removal of the plate LA and the tire M may be readily slipped off and another tire put in its place if desired. Advantageously the plates B, F, G, L, LA, I, J and K are formed of Monel metal, a well known natural alloy of high tensile strength, which will not corrode or rust and will take a high and durable polish. The last mentioned feature is of special importance in the case of the plates L and LA and B, the overlapping contacting surfaces of which will become highly polished in operation. I advantageously form a groove L' in the inner face of each of the plates L and LA, each groove extending circularly about the axis of the wheel, and in each of these grooves I place a band O of felt or the like, which serves as a holder for lubricating material and is anchored in place by means of soft metal rivets L².

With the wheel construction employed, the springs H and HA are entirely inclosed and are shielded against contact with mud, snow and sand, and to a considerable extent against wetting, by the inclosing housing. This housing assists in giving the wheel its necessary lateral strength and stiffness and on account of the smooth sides of the wheel formed by the side walls of this housing, the wheel will have less fan action and will lift smaller amounts of adhering mud or snow than the ordinary spoke wheel. The decrease in fan action means a desirable decrease in the air resistance to the rotation of the wheel and in the amount of dust raised by the wheel. The type of construction employed makes it possible to construct the wheel almost entirely of metal, as disclosed herein, without making the wheel either unduly heavy or unduly expensive. A wheel formed mainly or entirely of metal possesses certain obvious advantages; for instance, the wheel is not affected by atmospheric conditions or other causes tending to the destruction or deterioration of non-metallic wheels. A further advantage in the use of a metal wheel of the type disclosed is that the heat generated in the tire is rapidly conducted away from the tire and dissipated, owing to the ample heat conducting and heat radiating properties of the wheel. This is of especial importance where pneumatic or cushion tires are employed. The use of a spring wheel of the type referred to makes it possible either to entirely dispense with spring connections between the wheels and the vehicle body, or to employ spring connections which are lighter, have a more limited range of action, and are less expensive than would otherwise be necessary.

In the modified construction shown in Figs. 5 and 6, the annular plate IA adapted to replace the plates I of Figs. 1 to 4, is formed with a grooved seat $I^5$ for the spring lying wholly within the inner curved surface of the annular plate IA proper, the grooved seat being formed in a lug $I^4$ projecting inwardly from the inner curved wall proper of the plate IA.

The plate IB shown in Figs. 7, 8 and 9, differs from the plate shown in Figs. 1 to 4 in that the bottom walls $I^{20}$ of the recesses at the opposite side of each seat $I'$ are inclined to the plane of the plate, whereas the bottom walls of the recesses $I^2$ are parallel to the plane of the plate. In Figs. 7, 8 and 9 the recesses at the opposite sides of each lug $I^3$ are of the same depth immediately adjacent that lug as the grooved seat $I^2$, and these recesses progressively increase in depth as the distance from the lug $I^3$ increases. As shown best in Figs. 3 and 4, the recesses $I^2$ are of a uniform depth considerably greater than that of the grooved seat $I'$.

The plate IC shown in Fig. 10 differs from the plate I in that the hole $I^{15}$ for each bolt $E^2$ is placed nearer the inner margin of the annular plate and between the latter and the corresponding grooved spring seat $I^{10}$. In this construction also, the lug $I^{30}$ corresponding to the lug $I^3$ of the construction first described has its outer surface cylindrical, the radius of curvature being appreciably less than that of the corresponding spring H. It will be understood, of course, that modifications of the plates B, F and J, analogous to the modifications of the plate I shown in Figs. 5 to 9, inclusive, may be employed if and when desired.

When the clamping bolts pass through the springs as in Fig. 10, the spring receiving grooves must be greater in extent than when the clamping bolts lie wholly without the springs as in the other figures of the drawings. The formation of the spring receiving grooves wholly in lugs projecting from the corresponding curved edge of the plates as shown in Figs. 5 and 6 permits of the use of plates relatively light in weight as compared with the other forms shown.

While in accordance with the provisions of the statutes, I have illustrated and described the best forms of my invention now known to me, it will be apparent to those skilled in the art that changes may be made in the forms of apparatus disclosed without departing from the spirit of my invention, and that under some conditions certain features of my invention may be used without a corresponding use of other features.

Having now described my invention, what I claim as new and desire to secure by Letters Patent, is:

1. A spring wheel comprising in combination, a felly element, a hub element and annular springs connecting said elements, one of said elements having a laminated portion comprising an annular plate having grooves formed in one side with each groove open at its opposite ends and receiving a portion of a corresponding one of said springs, and a second plate between which and the bottom walls of the grooves in the other plate the springs received in said grooves are clamped.

2. A spring wheel comprising in combination, a hub, annular springs secured to said hub and projecting outwardly therefrom, and a felly to which said springs are each connected, said felly comprising a laminated portion formed of metal plates clamped together and having certain of said plates formed with grooves in their sides each groove having its ends open at the inner edge of the plate in which it is formed, said grooves receiving the outer portions of said springs, and each of said spring portions being clamped between the bottom wall of the groove receiving it and a plate adjacent that in which said groove is formed.

3. A spring wheel comprising in combination, a felly, annular springs secured to said felly and projecting inwardly therefrom, and a wheel center to which the inner portions of said springs are each connected, said center comprising a laminated portion formed of metal plates clamped together and having certain of said plates formed with grooves in their sides each groove having its ends open at the outer edge of the plate in which it is formed, said grooves receiving the inner portions of said springs, and each of said spring portions being clamped between the bottom wall of the groove receiving it and a plate adjacent that in which said groove is formed.

4. A spring wheel comprising in combination, a felly element, a hub element and annular springs connecting said elements, one of said elements having a laminated portion comprising an annular plate having grooves formed in one side each groove being open at both ends at the curved margin of the plate adjacent the other element and receiving a portion of a corresponding one of said springs, each groove being formed with a central shallow portion snugly receiving the portion of the spring entering it and enlarged portions at each side of said central portion in which the corresponding spring portions are free to move, and a second plate between which and the bottom walls of the said shallow portions of its grooves in the other plate the springs received in said grooves are clamped.

5. A spring wheel comprising in combination, a felly element, a hub element and annular springs connecting said elements, one of said elements having a laminated portion comprising an annular metal plate having open ended grooves formed in one side each groove being open at both ends at the margin of the plate adjacent the other of said elements and receiving a portion of a corresponding spring and a second annular metal plate between which and the bottom walls of the grooves in said second plate the springs received in said grooves are clamped.

6. A spring wheel comprising in combination, a felly element, a hub element, and springs connecting said elements, each of said elements comprising a laminated portion composed of annular metal plates between adjacent pairs of which corresponding portions of said springs are clamped, one of each of said adjacent pairs of plates being laterally grooved to provide open ended spring receiving channels.

7. In a spring wheel a laminated wheel felly formed of annular metal spring holding plates bolted together, some of said plates being formed with spring receiving channels, each of said channels being open along its length at the side of the plate in which the channel is formed and being open at its ends at the inner margin of the plate.

8. A laminated wheel felly formed of annular metal plates bolted together, and having certain of said plates laterally grooved to provide channels opening at their ends at the inner margin of the felly and adapted to receive springs, which may be clamped between the bottom walls of said channels and the plates adjacent those in which said channels are formed.

9. A spring wheel center comprising a hub and a plurality of annular metal spring holding plates coaxial with said hub, said plates being clamped together and secured to said hub, some of said plates being formed with spring receiving channels, each of said channels being open along its length at the side of the plate in which the channel is formed and being open at its ends at the outer margin of the plate.

10. A spring wheel center comprising a hub consisting of a tubular body and an outwardly extending flange and a set of annular metal spring holding plates surrounding said body and clamped against said flange, some of said plates being formed with spring receiving channels, each of said channels being open along its length at the side of the plate in which the channel is formed and being open at its ends at the outer margin of the plate.

11. A spring wheel center comprising a hub consisting of a tubular body and an outwardly extending flange, a set of annular metal spring holding plates surrounding said body and clamped against said flange and an annular non-metallic member surrounding said body and interposed between the latter and some of said plates, some of said plates being formed with spring receiving channels, each of said channels being open along its length at the side of the plate in which the channel is formed and being open at its ends at the outer margin of the plate.

12. A spring wheel comprising in combination, a felly element, a hub element, and springs connecting said elements, each of said elements comprising a laminated portion composed of annular plates recessed to receive corresponding portions of said springs, the outer plates of each of said elements being extended to overlap the correspondingly extended plates from the other element, the said overlapping plates forming the side walls of a housing inclosing said springs.

13. A spring wheel comprising in combination, a felly element, a hub element comprising a pair of spaced apart outwardly extending plates, and annular springs located between said plates and connecting said elements, said felly element comprising a set of annular plates of small radial depth and a pair of plates at the sides of said set of plates and extending outwardly therefrom to engage the sides of a tire mounted on said wheel and extending inwardly to engage and lap the outwardly extending plates from the hub element, means for clamping said set of plates to one of the said side plates and other means for clamping the other of said side plates to said set of plates.

14. A spring wheel comprising in combination, a hub element formed with two spaced apart plates, a laminated felly element comprising two outer spaced apart metal plates inwardly extended to overlap the said plates of the hub element and form a closed wheel chamber, and annular metal plates clamped between said extended plates, and springs located in the space between said overlapping plates and each separately connected to said hub and felly elements by being clamped between the plates thereof.

LEWIS P. BUCK.

Witnesses:
THOMAS H. BUCKLEY,
ALFRED WHARTENBY.